Nov. 25, 1930.　　M. H. KOTZEBUE　　1,782,783
CRUDE OIL AND NATURAL GAS SEPARATOR
Filed Sept. 22, 1924　　2 Sheets-Sheet 1

INVENTOR
MEINHARD H. KOTZEBUE
BY
ATTORNEY

Nov. 25, 1930. M. H. KOTZEBUE 1,782,783
CRUDE OIL AND NATURAL GAS SEPARATOR
Filed Sept. 22, 1924  2 Sheets-Sheet 2

INVENTOR
MEINHARD H. KOTZEBUE
By Franklin Graham
ATTORNEY

Patented Nov. 25, 1930

1,782,783

UNITED STATES PATENT OFFICE

MEINHARD H. KOTZEBUE, OF TULSA, OKLAHOMA, ASSIGNOR TO TRUMBLE GAS TRAP COMPANY, A COPARTNERSHIP CONSISTING OF FRANCIS M. TOWNSEND, MILTON J. TRUMBLE, AND A. J. GUTZLER

CRUDE-OIL AND NATURAL-GAS SEPARATOR

Application filed September 22, 1924. Serial No. 739,169.

My invention relates to the art of separating natural gas from crude oil at, for example, the time the oil is being discharged from the well. The discharge of crude oil from flowing wells is usually accompanied by considerable pressure, the oil being commingled with natural gas, and frequently with water and sand in varying proportions, according to well conditions. It is highly desirable to make a clean separation of these different substances from the oil and to perform this separation in such a manner that the function of the separating device does not in any way interfere with the free operation of the well. It is also desirable to separate from the gas all of the lighter constituents of the oil which are commonly found in the gas in suspended form and which, unless separated therefrom, are carried off with the gas, leaving the oil of a lower specific gravity and of less value than when such lighter constituents are taken from the gas and commingled with the oil.

My oil and natural gas separator consists primarily of a cylindrical receptacle or body adapted to be set in a vertical position, into which the product of the well may be introduced tangentially and against the inner walls of the receptacle. In this receptacle is arranged an inner cylindrical member, the walls of which are spaced apart from the walls of the receptacle, the space therebetween being converted into a spiral passageway by means such as a spiral track or flange mounted on the inner member and extending outwardly to within a short distance of the wall of the receptacle, leaving sufficient space therebetween to allow oil to flow downwardly over the inner walls of the receptacle without interference by the spiral blade or track. Any gas liberated may thus be caused to travel downwardly in a spiral path, even if eventually allowed to escape upwardly, by way of the inner member, from which it may flow past the conical baffles and upwardly out of the separator.

At or near the bottom of the separator may be arranged an oil outlet, which may be controlled by a valve on the outside of the separator, and which is preferably operated by means of a float mounted in the separator and movable by the accumulated body of oil therein.

Objects referred to above are accomplished, in my separator, primarily by (1) introducing the product of the well tangentially into a cylindrical vessel, so that the oil is spread upon the inner walls of the vessel and flows downwardly thereover, and (2) by causing the gas to travel downwardly for considerable distance in a spiral pathway, in contact with the oil and with the wall of an inner cylinder. This method, involving a spreading of the oil over a large surface, results in turning the layers and component particles of oil over while in a thin film, thereby releasing the gas from the oil freely, due to the fact of a continuous exposure of a new surface of oil to the gas; and, by the time the oil has traveled to the bottom of the receptacle, the oil is entirely or sufficiently free of gas.

The extended path of travel of the gas gives it an opportunity to deposit any liquid particles suspended therein on the walls of the inner cylinder or on the spiral track, where they accumulate and drain downwardly into and with the body of oil collected in the bottom of the receptacle.

Other advantages of my separator will appear more fully hereinafter from the following description and drawings, it being understood that I do not limit my invention to the specific forms shown.

Referring to the drawings which are for illustrative purposes only,

Figure 1:
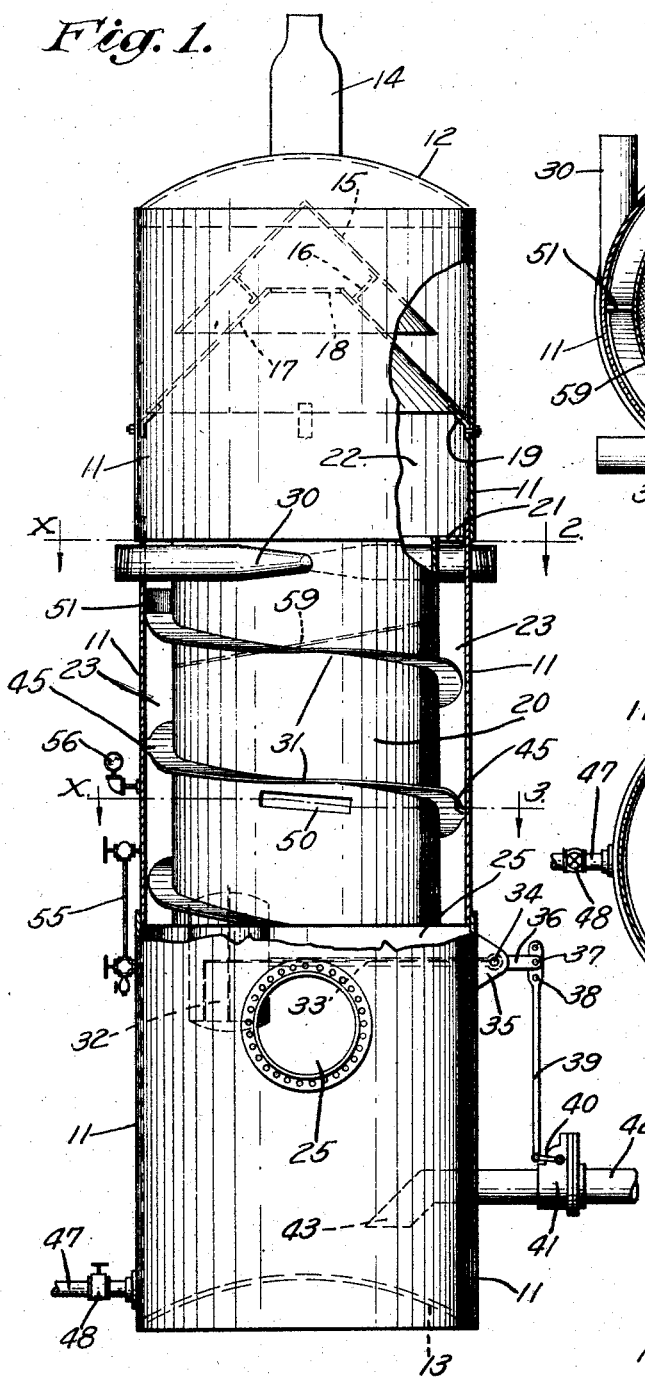
Fig. 1 is an elevational view, partially in section, of a separator embodying a preferred form of my invention.
Figure 2:
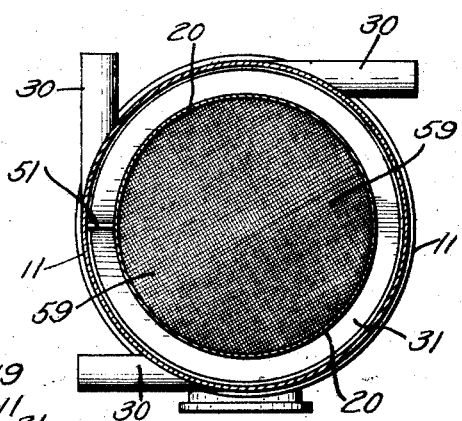
Fig. 2 is a sectional plan view on line $x$—2 of Fig. 1.
Figure 3:
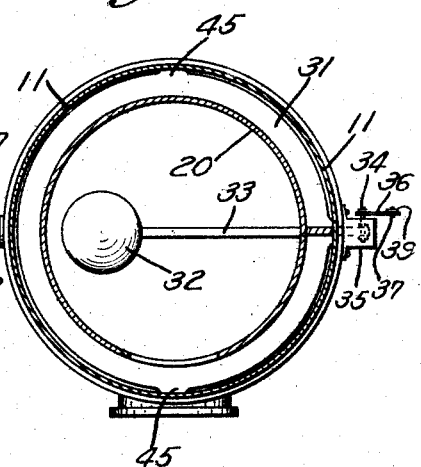
Fig. 3 is a sectional plan view on line $x$—3 of Fig. 1.

In the form of my invention shown in Figs. 1 to 3, inclusive, 11 designates a cylindrical outer shell or body closed at the top by a head 12 and at the bottom by a plate 13. Secured to the head 12 is a gas outlet 14, to which connections (not shown) may be made, to conduct the gas from the separator to any desired point.

Located in the upper portion of the shell 11 is shown a gas baffle comprising a closed imperforate cone 15, which may be supported, as by means of legs 16, on a second cone 17, shown as open at its apex, as indicated at 18, the cone 17 preferably extending to or nearly to the inner wall of the shell 11, and being optionally supported thereon, as by means of brackets 19.

Below the cones 15 and 17, and spaced apart from the outer shell, is shown an inner cylinder or shell 20, which may be supported on a ring or flange 21, this flange being optionally welded at its edges to the inner and outer shells. This ring or flange 21 thus forms a partition separating the space above the inner shell, which may be termed a gas chamber 22, from the space between the inner and outer shells 11 and 20, which space is indicated at 23 and termed the separating chamber. The inner shell 20 is shown as open at its upper and lower ends, the lower end terminating well above the bottom of the outer shell 11, thereby providing a settling chamber indicated at 25.

Oil may be introduced, as from a well or wells, by means such as one or more oil inlet pipes 30, these pipes being shown as arranged tangentially of the shell 11 and as entering the separating chamber directly under the partition 21.

Welded or otherwise secured to the outer face of the inner shell 20, and extending to within a short space from the shell 11, is shown a spiral plate or flange 31, and this may extend from directly below the inlet pipes 30 to the lower end of the shell 20, so dividing the separating chamber as to form a spiral passageway or conduit, surrounding a central passageway, for the purposes hereinafter more fully explained.

Below the inner cylinder 20 is mounted a float 32, shown as supported on a float arm 33, which may be pivotally connected to a shaft 34 in a housing 35 on the shell 11. Fixed to the shaft 34 is a rock arm 36, which may be connected, as by means of a pin 37, to a selected hole 38 in the upper end of a link 39. The lower end of the link 39 is shown as connected to a valve arm 40, which may operate a valve 41 in the oil outlet pipe 42. This oil outlet pipe 42 extends through the wall of the shell to the interior thereof, the inner end of the pipe 42 being preferably extended downwardly, as indicated at 43.

By this preferred construction, the link 39 and its connections to the valve 41 being exterior of the separator, adjustment of the relative position of the float and valve may readily be varied by inserting the pin 37 into the different holes 38, there being a plurality of such holes 38 in one end or the other of the link 39. Such adjustment may be used for varying the level of the oil in the settling chamber, to meet varying conditions encountered.

The operation of my separator, when organized as shown in Figs. 1 to 3 inclusive, is as follows:

A mixture of gas and oil from the well or wells is introduced into the separator through the pipes 30, which being arranged tangentially of the shell 11, the oil and gas are delivered with a swirling motion against the inner walls of the shell 11. Some of the oil at its introduction, strikes on the upper face of the spiral plate or track 31; but, due to the centrifugal action resulting from the manner of introducing the oil, such oil is thrown outwardly against the inner wall of the shell 11, over which the entire body of oil is spread in a thin downwardly flowing film or sheet, between the outer edge of the spiral track 31 and the shell 11,—the spiral track being optionally provided with a plurality of lugs 45, which extend outwardly therefrom into engagement with the outer shell 11, thereby spacing the outer edge of the spiral track 31 from the inner wall of the shells, and leaving a space therebetween downwardly through which the oil runs on the inner wall of the shell 11.

At the initial discharge of oil from the pipes 30 into the separator, it is obvious that some of such oil will be discharged upon the upper part of the spiral track 31, but such oil due to centrifugal action and downward flow soon is spread upon the inner surface of the shell 11.

The oil traveling downwardly over the shell in a thin film is constantly turning over so that the gas entrained therein has an opportunity to escape until the oil reaches the settling chamber, where water and sand, that may be carried in the oil, separate and settle according to their respective gravities and may be drained from the separator at will, as through an outlet pipe 47, shown as controlled by a valve 48.

The gas delivered to the separator is caused to travel for a distance downwardly in the spiral path 23 and in contact with the film of oil flowing down the inner face of the shell until it reaches the lower part of the inner shell 20, when it escapes to the inside of the shell 20, or through opening 50 therein. The ring 21 and upturned end 51 of the track 31 form a closure at the upper end of the spiral track, so that the gas is caused to flow downwardly, as just described, the downward flow of the gas being assisted by the tangential introduction of the gas mixture into the seperator by the pipes 30. The gas, traveling in contact with the plate or track 31 and outer surface of the shell 20, deposits upon such surfaces the particles of oil carried therein, such oil dropping to the settling chamber and commingling with the oil thereon.

The gas passes upwardly through the shell 20, and through a screen 59, shown as inclined therein, and the cone 17, being deflected by the underside of the cone 15, when this is provided. The screen and cones break up the direct current of gas and allow a further collection of oil on the surfaces thereof, so that the gas, as it finally passes out of the gas outlet 14, may be substantially dry and free of those lighter constituents of the oil which have heretofore ordinarily escaped with the gas. I have found that it is desirable to maintain a body of the oil in the settling chamber, primarily to form a trap, so that at no time can the gas enter the oil outlet pipe; and for the regulation of the height of this body of oil I provide the float 32, which operates the valve 41 to dicharge the oil when it reaches a predetermined height, a sight glass 55 being provided for observation of the oil level. A pressure gauge 56 is preferably also provided, so that the internal pressure of the separator may be observed and regulations accordingly made.

Figure 4:
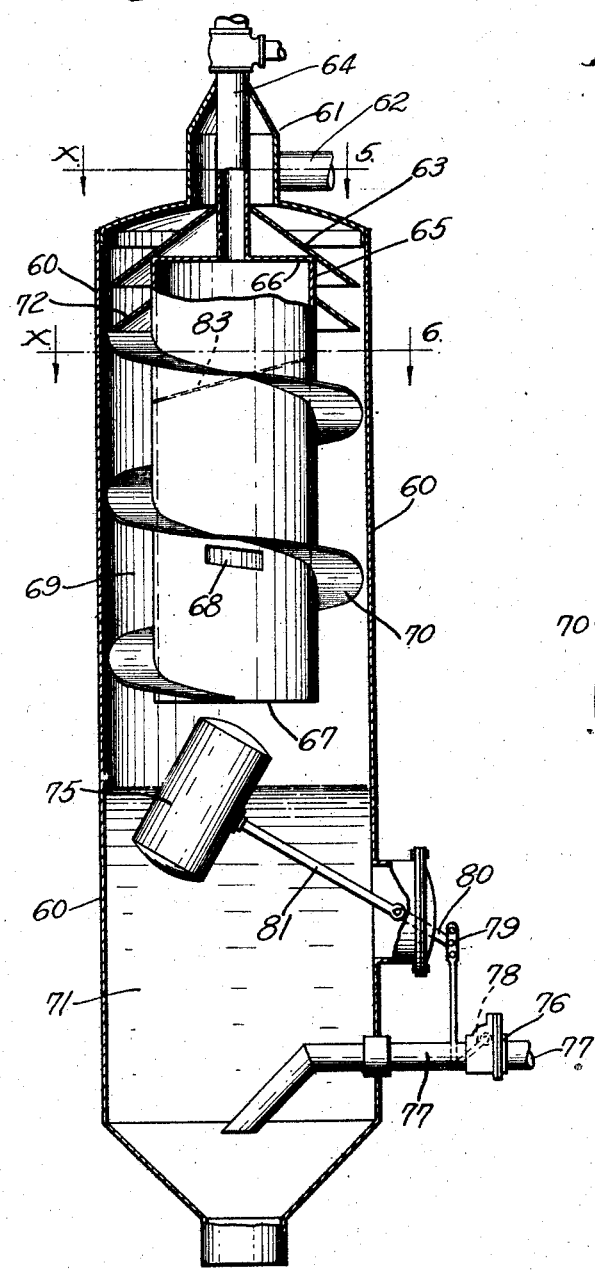
Fig. 4 is a vertical sectional view of a separator showing a modified form of my invention.
Figure 5:
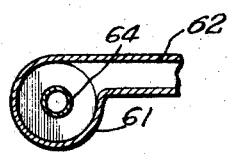
Fig. 5 is a sectional plan view on line $x$—5 of Fig. 4.
Figure 6:
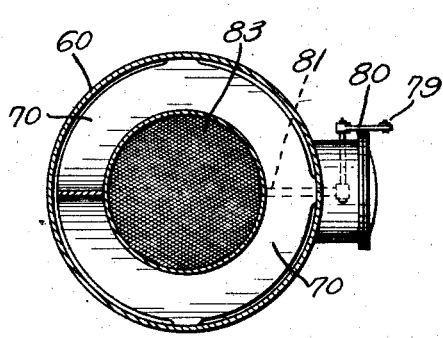
Fig. 6 is a sectional plan view on line $x$—6 of Fig. 4.

In the form of my invention shown in Figs. 4 to 6 inclusive, an outer shell 60 is provided with a housing 61, into which a mixture of oil and gas is delivered, as from a well, preferably by means of a tangentially arranged inlet pipe 62, the oil and gas being delivered above an upper cone 63 secured in any suitable manner and shown as mounted upon a gas outlet pipe 64. Directly under the cone 63 is an inner circular shell 65, which may be in open communication through its top 66 with the gas outlet pipe 64. The inner shell 65 may be open at its lower end, as indicated at 67 and it is also shown as provided with an opening 68 in the side walls thereof, through which gas may escape from the separating chamber 69, such separating chamber constituting a spiral passage formed by a spiral track 70 mounted in any suitable manner, and preferably upon the inner shell 65, the outer edge of such track being shown as terminating short of the inner wall of the outer shell 60, leaving a space between the edge of such track and the shell for permitting the oil delivered into the separator to flow downwardly over the inner wall of the shell 60 and to the settling chamber 71, in the lower part of the receptacle. 72 designates a conical element or deflector below the cone 63, to divert to the inner wall of the shell 60 any oil which may splash under the cone 63. In this form of my invention I also provide a float 75, which operates through the valve arm 78, link 79, arm 80 and float arm 81, a valve 76 on the oil outlet pipe 77.

The operation of the separation of gas from the oil may be substantially the same in this form of my invention, just described, as in the form of my invention shown in Figs. 1 to 3, inclusive, although after the gas passes into the inner shell 65 (through the opening 68 or through the open bottom 67) and after it passes through a baffle in the form of an inclined screen 83, when such is employed, the gas is discharged through the outlet pipe 64, without encountering conical baffles such as are disclosed in the form shown in Figs. 1 to 3 inclusive.

Although I have herein described one complete embodiment of my invention, it will be understood that various features thereof might be independently employed and also that various modifications might be made, by those skilled in the art, without the slightest departure from the spirit and scope of my invention, as the same is indicated above and in the following claims. For example, the form, dimensions, number and elevation of such gas opening or openings as are indicated at 50, in Fig. 1, and at 68, in Fig. 4, may be varied according to dictates of experiment or practical experience in the separating of mixtures actually encountered.

I claim as my invention:

1. In an oil and natural gas separator, a cylindrical outer shell having an uninterrupted inner surface, an inner shell of shorter dimensions than the outer shell spaced apart from the outer shell forming a separating chamber therebetween, a division wall at the upper end of the inner shell extending outwardly therefrom to the outer shell, a spiral flange on said inner shell extending outwardly therefrom to form said separating chamber into a spiral passage for the gas therein, the outer edge of said flange being spaced apart from the outer shell, means for introducing an oil and gas mixture into the upper portion of the separating chamber against said division wall, said inner shell being formed with an opening near the lower end thereof to permit gas from the separating chamber to enter the inner shell and pass upwardly therethrough, a screen in said inner shell; baffle means above said inner shell; gas outlet means in the upper end of said outer shell, and float-operated means for discharging oil from the lower portion of the outer shell.

2. In an oil and natural gas separator, a cylindrical outer shell, an inner shell of shorter dimensions than the outer shell spaced apart from the outer shell forming a separating chamber therebetween, a division wall at the upper end of the inner shell extending outwardly therefrom to the outer shell, a spiral flange on said inner shell extending outwardly therefrom to form said separating chamber into a spiral passage for the gas therein, the outer edge of said flange being spaced apart from the outer shell, means for introducing an oil and gas mixture tangentially into the upper portion of the separating chamber, said inner shell being formed with an opening near the lower end thereof to permit gas from the separating chamber to enter the inner shell and pass upwardly therethrough; gas outlet means in the upper end of said outer shell, and float-operated means for discharging oil from the lower portion of the outer shell.

3. In an oil and natural gas separator, a cylindrical outer shell, an inner shell of shorter dimensions than the outer shell spaced apart from the outer shell forming a separating chamber therebetween, a division wall at the upper end of the inner shell extending outwardly therefrom to the outer shell, a spiral flange on said inner shell extending outwardly therefrom to form said separating chamber into a spiral passage for the gas therein, the outer edge of said flange being spaced apart from the outer shell, means for introducing an oil and gas mixture tangentially into the upper portion of the separating chamber, gas outlet means in the upper end of said outer shell, and float-operated means for discharging oil from the lower portion of the outer shell.

In testimony whereof, I have hereunto set my hand at Tulsa, Oklahoma, this 16 day of September, 1924.

MEINHARD H. KOTZEBUE.